United States Patent [19]

Bussey, Jr.

[11] 4,234,657
[45] Nov. 18, 1980

[54] FOAMABLE THERMOPLASTIC STICK AND FOAMED ELEMENT MADE THEREFROM

[76] Inventor: Harry Bussey, Jr., P.O. Box 115 Serpentine Rd., Navesink, N.J. 07752

[21] Appl. No.: 17,133

[22] Filed: Mar. 5, 1979

Related U.S. Application Data

[62] Division of Ser. No. 886,075, Mar. 13, 1978.

[51] Int. Cl.$^2$ .............. B32B 1/00; D02G 3/00
[52] U.S. Cl. ................... 428/400; 428/156; 428/159; 428/167; 428/179; 428/357; 428/358; 428/364; 428/369; 428/398; 428/542
[58] Field of Search ............... 428/364, 397, 398, 357, 428/358, 376, 400, 159, 158, 160, 167, 179, 156, 542, 369

[56] References Cited

U.S. PATENT DOCUMENTS

| | | | |
|---|---|---|---|
| 1,816,043 | 7/1931 | Fales | 428/400 |
| 2,434,533 | 1/1948 | Würzburger | 428/371 |
| 3,066,382 | 12/1962 | Zweigle et al. | 428/369 |
| 3,092,873 | 6/1963 | Kay et al. | 425/464 |
| 3,188,264 | 6/1965 | Holden | 428/357 |
| 3,251,728 | 5/1966 | Humbert et al. | 428/369 |
| 3,393,083 | 7/1968 | Yukichi Go | 427/278 |
| 3,481,455 | 12/1969 | Graham et al. | 206/46 |
| 4,027,064 | 5/1977 | Bussey, Jr. | 428/357 |

Primary Examiner—Lorraine T. Kendell
Attorney, Agent, or Firm—Kenyon & Kenyon

[57] ABSTRACT

Sticks of foamable thermoplastic material are provided with grooves in at least one surface. These grooves extend width-wise of the stick. In addition, the grooves are disposed in equi-spaced relation along one surface of the stick, or in spaced-apart series or groups on only one surface, or in series or groups on opposite surfaces and in spaced-apart relation. Upon foaming, the sticks form foamed elements of various shapes, each of which has at least one curvilinear portion such as, for example, a corkscrew shape, an annular shape or shapes with reverse bends.

10 Claims, 16 Drawing Figures

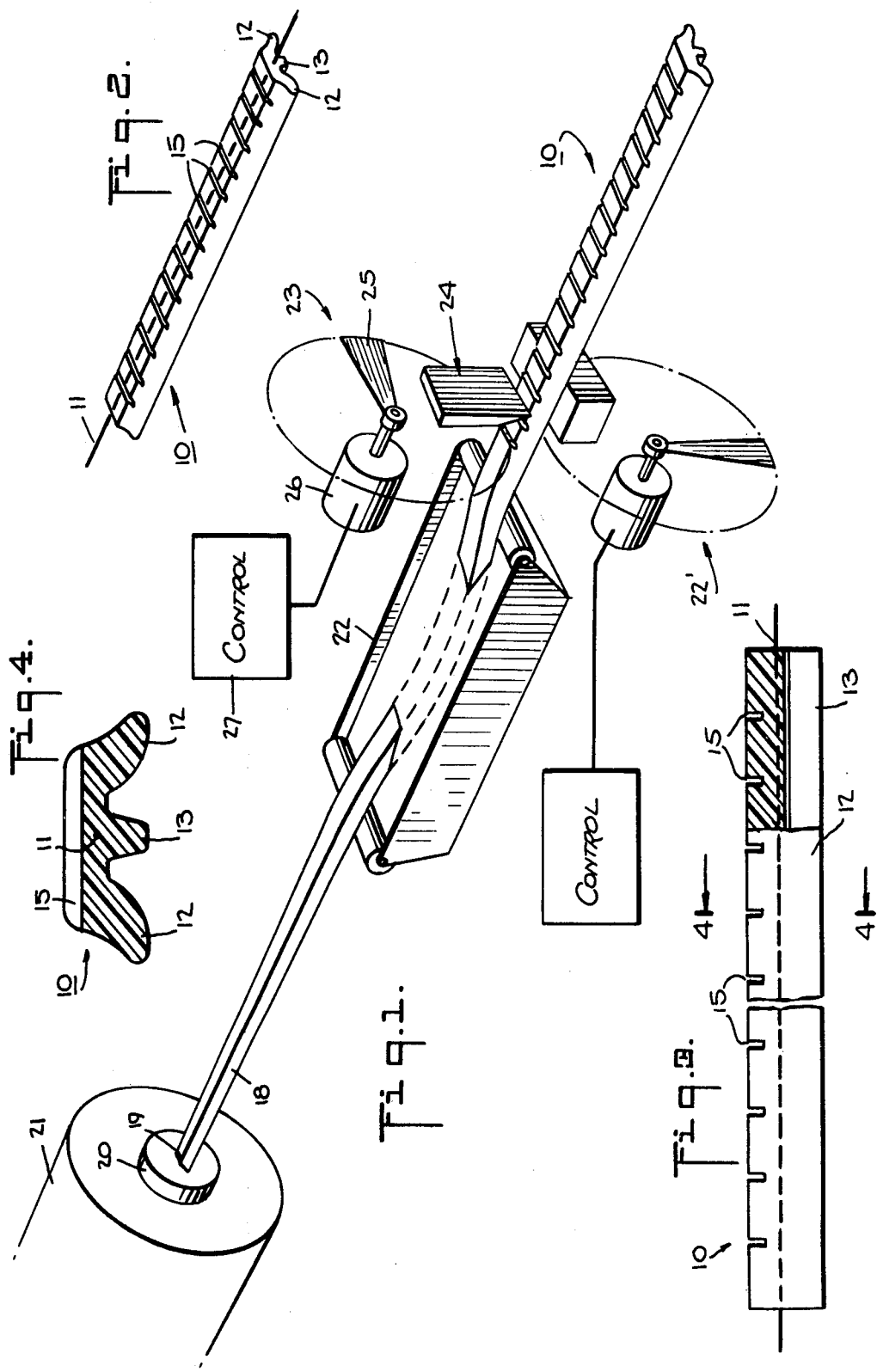

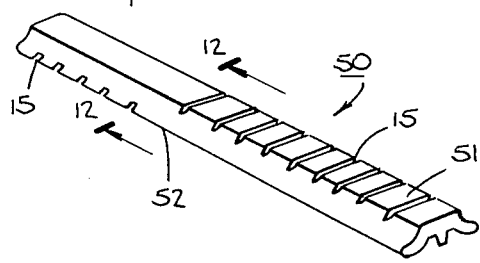
Fig. 11.
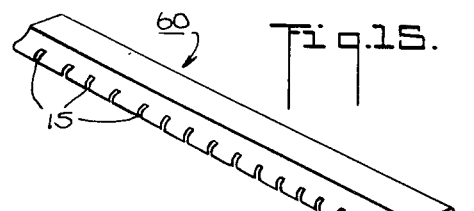
Fig. 15.
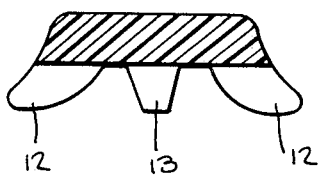
Fig. 12.
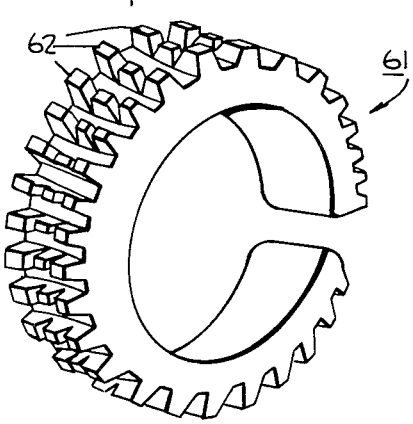
Fig. 16.
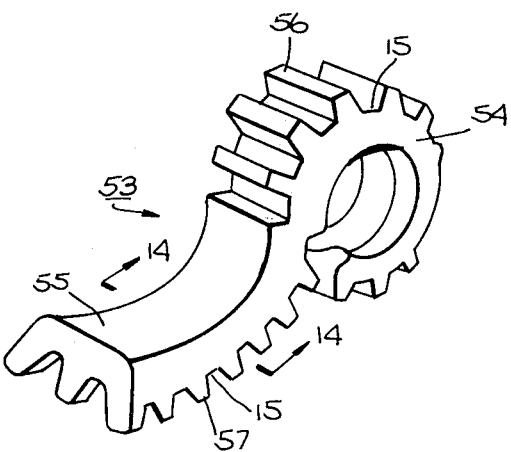
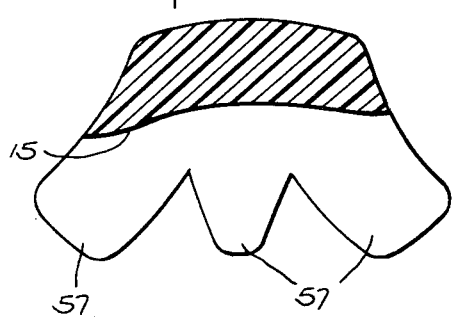
Fig. 14.
Fig. 13.

FOAMABLE THERMOPLASTIC STICK AND FOAMED ELEMENT MADE THEREFROM

This is a division of application Ser. No. 886,075 filed Mar. 13, 1978.

This invention relates to a foamable thermoplastic material and foamed elements made therefrom. More particularly, this invention relates to foamable thermoplastic sticks and foamed elements of various configurations made therefrom.

As is known, various types of foamable thermoplastic materials have been made for various purposes. In some cases, strands of foamable thermoplastic material have been produced and subsequently granulated into small particles for use, for example, in molding various articles. In other cases, strands or belts of the foamable thermoplastic material have been formed with certain cross-sections, and severed along the longitudinal axis of the strands so as to produce elements, such as described in U.S. Pat. No. 4,027,064, which can be expanded into elements suitable for loose-fill packaging purposes. As is also known, it is easier and less costly to ship the thermoplastic material in the foamable state to an end user rather than in an expanded state, where the end user can expand the material. Such shipment enables a considerable saving in the space occupied by the shipment, and consequently reduces the cost of shipment as well as easing its handling.

However, because the foamable material is generally packaged in a random manner for bulk shipment, there is often a significant amount of empty space in the shipping container when the material is of a contoured shape.

Accordingly, it is an object of the invention to provide a foamable thermoplastic material which can be packaged and shipped within a relative minimum of space.

It is another object of the invention to provide a foamable thermoplastic material which can be foamed into irregular shapes.

It is another object of the invention to provide a relatively simple method of making a foamable thermoplastic material which can be foamed into a variety of irregular shapes.

It is another object of the invention to provide foamed thermoplastic elements which can have a variety of uses.

It is another object of the invention to provide foamed thermoplastic elements which can be used as loose-fill packaging elements.

Briefly, the invention provides a foamable thermoplastic material which is made in the form of generally straight sticks with substantially uniform cross-sections along their respective longitudinal axis, as well as a plurality of grooves in at least one surface of each stick extending width-wise of the longitudinal axis.

The grooves in a stick can be of straight shape or of curved shape and can be disposed at an acute angle to or perpendicularly of the longitudinal axis of the stick.

The grooves in the sticks may be disposed in equispaced relation along the stick axis, or in spaced-apart series or groups along the stick axis, or on two opposite surfaces of the stick with the grooves in one surface being longitudinally spaced from the grooves in the outer surface.

In one embodiment, the cross-sectional shape of the sticks is generally E-shaped with a pair of legs disposed in splayed-out relation to a generally smaller central leg.

The invention further provides a foamed thermoplastic element with at least one curvilinear portion and substantially uniform cross-sections along the longitudinal axis of the element, as well as a plurality of spines which project from at least one surface of the element. These spines are angularly disposed relative to the longitudinal axis, that is either at an acute angle to the axis or perpendicularly of the axis. Where the spines are disposed at an acute angle, the foamed element is of a cork-screw configuration along the longitudinal axis.

In another embodiment, where the spines are equispaced along the longitudinal axis, the axis of the element follows a curvilinear path throughout the length of the element. In this case, the element is coiled upon itself within a common plane.

In another embodiment, the foamed element has a spineless central section of straight configuration and a pair of spined end sections of curvilinear configuration. Such an element, which resembles a bracelet in appearance, may be used for decorative, display or novelty purposes as well as for a loose fill packaging material. As in the case of the previously described embodiments, the curvilinear portions of the foamed elements allow the element to be hung readily from a wire or hook. The element of this embodiment may also be used, for example, as a novelty bracelet for children or a support for displaying watches.

In still another embodiment, the foamed element has one curvilinear section with spines on one surface and a second curvilinear section with spines on an opposite surface. In this element, the two sections are reversely curved with respect to each other. Such an element may be used for decorative, display or novelty purposes as well as for a loose-fill packaging material.

In still another embodiment, the foamed element has spines which are interrupted perpendicularly of the longitudinal axis. This element generally has an annular configuration and may be used for decorative, display or novelty purposes as well as for a loose fill packaging material. For example, the split-ring nature of the element permits a degree of flexibility to allow its positioning about the wrist of an individual, and the element may be used to make bracelets, for example, for children.

The invention also provides a method of making a foamable thermoplastic element with relatively simple steps. For example, the method includes the steps of extruding a flowable thermoplastic material containing a foaming agent through a die opening of a predetermined shape, passing the extruded material to a cooling zone to cool the material and form a foamable stick, and forming a plurality of grooves in at least one surface of the extruded material width-wise of the extruded axis of the material. The cooling zone may be in the form of a water bath through which the extruded material is passed with formation of the grooves occurring during cooling, following passage of the extruded material from the water bath or prior to passage of the extruded material into the water bath.

These and other objects and advantages of the invention will become more apparent from the following detailed description taken in conjunction with the accompanying drawings wherein:

FIG. 1 illustrates a schematic view of equipment used in making a foamable thermoplastic stick in accordance with the invention;

FIG. 2 illustrates a stick of foamable thermoplastic material in accordance with the invention;

FIG. 3 illustrates a side view of the stick of FIG. 2;

FIG. 4 illustrates a view taken on line 4—4 of FIG. 3;

FIG. 11 illustrates a stick having a further modified pattern of grooves on two opposite surfaces of the stick in accordance with the invention, FIG. 12 illustrates a view taken on line 12—12 of FIG. 11;

FIG. 13 illustrates an element foamed from the stick of FIG. 11;

FIG. 14 illustrates a view taken on line 14—14 of FIG. 13;

FIG. 15 illustrates a foamable stick similar to FIG. 2 with grooves along the underside in accordance with the invention; and FIG. 16 illustrates an element foamed from the stick of FIG. 15.

Figure 5:
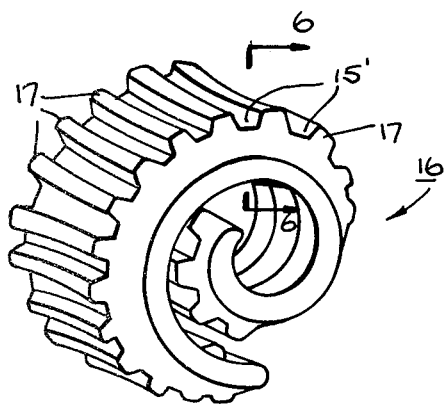
FIG. 5 illustrates an element foamed from the stick of FIG. 2.

Referring to FIGS. 2 and 3, the stick 10 is made of a foamable thermoplastic material, such as a polystyrene with an expanding agent therein. Such materials are well known and require no further description. As shown, the stick 10 has a substantially straight longitudinal axis 11 and a substantially uniform cross-sectional shape along its longitudinal axis 11. For example, the stick has a generally E-shaped cross-section with a pair of legs 12 disposed in splayed-out relation and a straight center leg 13. The outer legs 12 are each larger than the center leg 13 as illustrated in FIG. 4.

The elongated stick 10 is provided with a plurality of grooves 15 in its surface opposite to the legs 12, 13. These grooves 15 extend perpendicularly of the axis 11 and are disposed in equi-spaced relation along the length of the stick. Each groove 15 is of rectangular shape but may also of other shape e.g. trapezoidal. Also, each groove 15 extends past the axis 11, as viewed in FIG. 4, and may have various depths along the length of the groove 15. For example, the grooves 15 may be interrupted, of chevron shape, or with a deeper depth at the middle than at other points.

Figure 6:
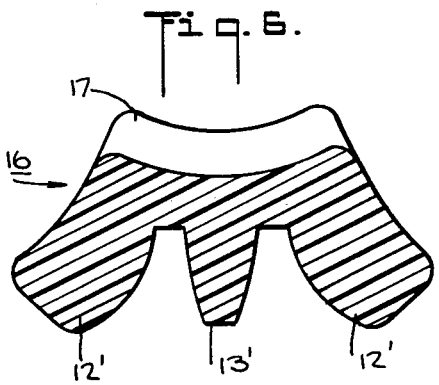
FIG. 6 illustrates a view taken on line 6—6 of FIG. 5.

Referring to FIGS. 5 and 6, when subjected to heat, the stick 10 foams in a known manner due to the inherent nature of the material from which the stick 10 is made. For example, the stick 10 may foam from five (5) to ninety-five (95) times its original size, i.e. the material foams from a raw state at about 30 to 35 pounds per cubic foot to about 0.3 to 6 or 7 pounds per cubic foot. During foaming, the stick 10 expands and coils in accordance with this invention to form a foamed thermoplastic element 16 (FIG. 5). As shown, the foamed element 16 is coiled about itself so that its longitudinal axis follows a curvilinear path throughout the length of the element 16. In addition, spines 17 project from the outermost surface of the element 16. Each spine 17 is disposed between two grooves 15' which correspond to the grooves 15 in the foamable stick 10. As shown, these spines 17 are disposed perpendicularly of the axis of the element 16 and are equi-spaced.

As illustrated in FIG. 6, the innermost surface of the foamed element 16 has a pair of legs 12' and a center leg 13' conforming generally to the cross-sectional shape of the legs 12,13 of the foamable stick 10.

It has been found that by providing the grooves 15 in the sticks 10, zones of weakening appear to be provided in other sections of the stick 10, causing the straight stick 10 to curl when foamed and form the curled foamed element 16.

It has also been found that the resulting foamed element 16 has a continuous skin and, albeit relatively resilient, is sufficiently rigid, for example, to act as a driving gear when its spines 17 are intermeshed with the grooves 15' of another similar element 16.

Referring to FIG. 1, in order to make an elongated stick 10, a flowable thermoplastic material 18 containing a foaming agent is extruded through a die opening 19 of a die 20 mounted on an extruder 21 of conventional construction, passed via pulling rolls (not shown) 21' through a cooling zone formed, for example, by a water bath 22 and grooved by a suitable grooving means 23, and then severed into desired lengths by a cutter 24. The size of the die opening is of a height of approximately 0.40 centimeters or about 0.150 inches, while the width of the die opening is of about two to three times the thickness.

The extruder 21 is of any suitable conventional construction and need not be further described. Similarly, the water bath 22 is used in a conventional manner to cool the extruded material 18, the cooling being to a sufficient degree to permit formation of grooves therein by the grooving means 23.

The pulling rolls (not shown) may be used to pull the extruded material 18 at the extrusion rate or at a higher rate to hot stretch the material.

The grooving means 23 is in the form of a fly knife 25 which is positioned above the plane of the extruded material 19 and driven by a motor 26 in timed relation to the speed of extrusion of the extruded material so as to form the grooves 15 at equi-spaced distances in the upper surface of the extruded material. Any suitable control 27 may be used for this purpose and may be connected to the motor 26 of the fly knife 25.

Alternatively, the grooving means 23 may utilize a vertically reciprocating blade (not shown) to form the grooves 15. Also, the grooving means may be in the form of a pair of rollers between which the extruded material passes with one of the rollers having a suitable groove foaming means therein.

The cutting means 24 may be of any suitable construction and need not be further described. As indicated in FIG. 1, the cutting means 24 may sever the extruded material 18 through a groove 15.

Referring to FIG. 1, a second grooving means 23' may also be provided underneath the extruded material 18 to groove the underside surface of the extruded material 18. The two grooving means 23, 23' can both be operated at the same time, or at different times or intermittently to impart different patterns of grooves in the extruded material 18. In this regard, it is noted that the cutting means 23, 23' are not operated at the same time when grooves are not desired in the extruded material 18 in opposed sections of the upper and underside surfaces of the extruded material 18.

Generally, there is a direct relation between the depth of the grooves, the number of grooves per unit length, the width of the grooves, the angle of the groove, the shape of the grooves, the amount of stretching of the extruded material and the amount of coiling of the foamed element 16. For example, the greater the depth of the grooves 15, the greater the amount of coiling, and vice versa.

While the coiling is generally intended to take place with the longitudinal axis of the foamed element 16 being in a single plane, it has been found that coiling can occur in a manner such that the resultant foamed element is not so coiled in a single plane, but instead with the longitudinal axis of the foamed element being generally helical or skewed rather than being in a single plane.

Figure 7:
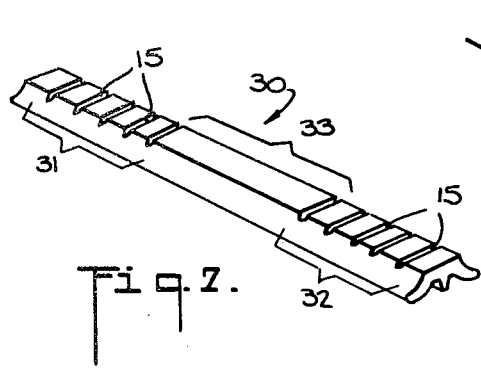
FIG. 7 illustrates a perspective view of a foamable thermoplastic material stick having a modified pattern of grooves in accordance with the invention.

As illustrated in FIG. 7, the elongated stick 30 may alternatively be formed with grooves 15 which are disposed in spaced-apart groups or series 31, 32. As indicated, the two end sections 31, 32 of the stick 30 are grooved while the central section 33 remains ungrooved. This pattern of grooves can be obtained by deactivating or moving the cutting means 23 from the extruded material when desired to provide an ungrooved section 33.

Figure 8:
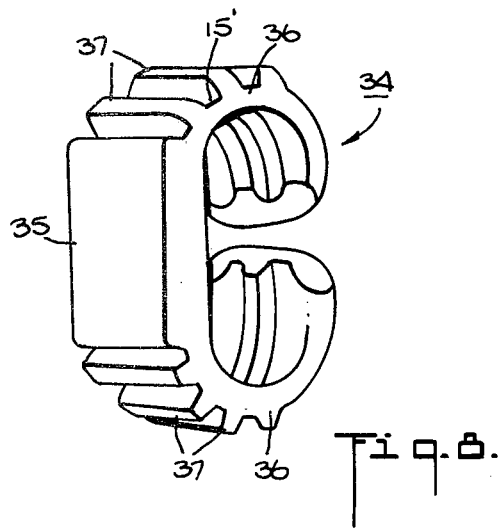
FIG. 8 illustrates an element foamed from the stick of FIG. 7.

Referring to FIG. 8, when the stick 30 illustrated in FIG. 7 is foamed in a suitable manner, the resultant element 34 has a spineless central section 35 of straight configuration and a pair of spined end sections 36 of curvilinear configuration. As indicated, the two end sections 36 are provided with spines 37 which are interspaced with grooves 15' conforming to the grooves 15 in the stick 30 from which the element 34 is made.

As shown in FIG. 8, the foamed element 34 is of generally oval or elliptical shape with the two end portions 36 spaced from each other. In this condition, the foamed element 34 may be used with other like elements for the loose fill packaging of items in shipping cartons. Alternatively, the element 34 may be used for decorative, display or novelty purposes. For example, for decorative use the element 34 may be suspended via the curvilinear end portions 36 from a hook, wire or the like in a vertical position. Alternatively, for display use the element 34 may be disposed in a vertical or horizontal condition on a support plate, for example for the display of wrist watches. Alternatively, for novelty use the element 34 may be used as a bracelet for children or, with advertising or other promotional material on its central section 35, for promotional or novelty use at sales shows or the like.

Figure 9:
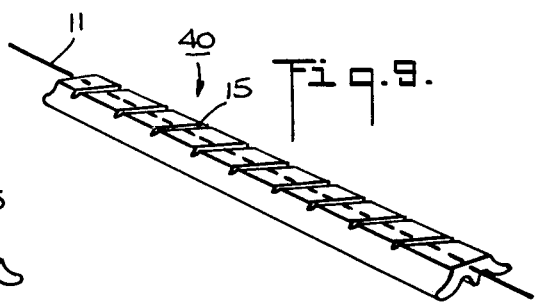
FIG. 9 illustrates a stick having a further modified pattern of grooves in accordance with the invention.
Figure 10:
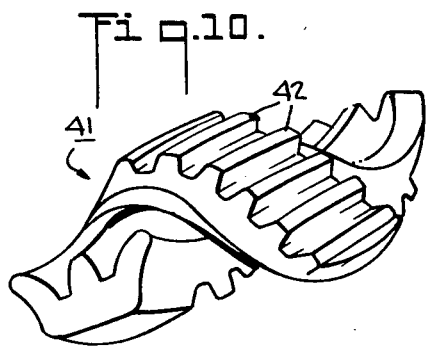
FIG. 10 illustrates a view of an element foamed from the stick of FIG. 9.

Referring to FIG. 9, wherein like reference characters indicate like parts as above, a foamable stick 40 (made in a similar fashion as the previously described embodiments of the invention) has grooves 15 which are formed at an acute angle to the longitudinal axis 11 of the stock. Such forming is provided by, for example, a positioning of the grooves means 23 (FIG. 1) at an acute angle to the longitudinal axis 11. When foamed, the stick 40 forms a foamed element 41 (FIG. 10) which has spines 42 disposed at an acute angle to the longitudinal axis of the foamed element 41, and the foamed element 41 is of a generally cork-screw configuration along the longitudinal axis.

Referring to FIG. 11, the foamable stick 50 may alternatively be provided with grooves 15 which are disposed on two opposite surfaces 51, 52 of the stick 50. As shown, the grooves 15 in the upper surface 51 of the stick 50 are longitudinally spaced from the grooves 15 in the under surface 52. The grooves 15 which are formed in the underside of the element 50 extend for a depth substantially equal to the depth of the legs 12, 13 of the stick 50 (FIG. 12).

When foamed, the stick 50 illustrated in FIG. 11 forms a foamed element 53 having a pair of curvilinear sections 54, 55 (FIG. 13) which are reversely curved with respect to one another. In addition, both curved sections 54, 55 have spines 56, 57 projecting from their outermost surface, with the spines 57 in the under side being interrupted perpendicularly of the longitudinal axis of the element 53 due to the presence of the legs 12, 13. As a result, these spines 57 take on a tooth-like configuration as illustrated in FIG. 13.

The foamed element 53 which is in a shape similar to that of a seahorse, may be used for various decorative, display or novelty purposes, or for a loose fill packaging material.

In order to form the grooves 15 in the opposite surfaces 51, 52 of the stock 50, use is made of the two cutting means 23, 23' illustrated in FIG. 1, with each of the cutting means being timed in a suitable manner to intermittently form alternating series of grooves in the surfaces 51, 52.

Referring to FIG. 15, the illustrated stick 60 of foamable material has grooves 15 formed only on its undersurface, for example by means of a cutting means 23' as shown in FIG. 1. When foamed, the stick 50 forms a foamed element 61 which is of annular configuration, for example a generally elliptical shape with a split-ring configuration. As illustrated in FIG. 16, a series of interrupted spines 62 are formed on the outermost surface of the element 61. These spines 62 are of similar configuration to the spines 57 of the element 53 shown in FIG. 13.

Because of its split-ring configuration, the foamed element 61 can readily be used for decorative or novelty purposes. For example, the element 61 may be used as a bracelet, for example by children. Also, the element may be used with a plurality of like elements for a loose fill packaging material.

The invention provides substantially straight sticks of foamable thermoplastic material which can be packaged in parallel relation to one another and shipped in relatively small boxes for subsequent expansion by an end user. As such, the sticks occupy a minimum of space and reduce the overall cost of shipment. Further, since the sticks may be grooved in different patterns, various types of sticks can be shipped to end users who require foamed elements of different shapes.

Further, the invention allows the production of a single extruded strip of material which can be subsequently grooved to allow the formation, upon foaming, of a variety of different foamed shapes. That is, a single extruder and extruder die can be used to make a variety of different foamed shapes. As described above, the invention allows the shapes of the resulting foamed elements to be controlled by positioning the grooves in the foamable sticks in predetermined patterns, spacings and depths. As noted above, the greater the depth of the groove, the greater the amount of curling.

When used for decorative, display or novelty purposes a suitable pigment or other coloring agent can be intermixed with the expandable material prior to its extrusion from the die so that the elements are colored or, alternatively, the foamed elements may be immersed in a coloring bath. When used as a packaging material, the spines aid in the nesting of and in preventing shifting of a packaged product.

It is to be noted that the cross-sectional shapes of the foamed elements may be other than E-shaped as illustrated in the figures. For example, prior to being grooved the extruded sticks may be oval, C-shape, round, flat, rectangular and the like.

Further, it is to be noted that when the extruded material 18 (FIG. 1) is pulled upon passage from the die 20, the degree of pulling is sufficient to prevent radial expansion of the material 18 but not longitudinal foaming. Further, the stretching causes the bubbles of expanding agent in the material 18 to stretch so that when the resultant sticks 10 are expanded, the greatest expansion occurs radially of the stick axis 11.

Generally, the sticks can be made in various sizes. For example, for a minimum extruded length of 2.0 centimeters, the sticks have a width of 1 to 3 centimeters, i.e. an extruded length to width of at least 2:1. The stick 10 of FIG. 2 can have an extruded length of any suitable length, for example when used for making loose fill packaging material the stick 10 may have a length of 1 to 20 centimeters and a width of 5 centimeters or less.

What is claimed is:

1. A straight stick of foamable thermoplastic material having a substantially uniform cross-sectional shape along a longitudinal axis, and a plurality of grooves in at least one surface thereof extending width-wise of said longitudinal axis.

2. A stick as set forth in claim 1 wherein said cross-section is generally E-shaped with a pair of legs disposed in splayed-out relation to a center leg.

3. A stick as set forth in claim 2 wherein each leg of said pair of legs is larger than said center leg.

4. A stick as set forth in claim 1 wherein said grooves are disposed at an acute angle to said longitudinal axis.

5. A stick as set forth in claim 1 wherein said grooves are disposed perpendicularly of said longitudinal axis.

6. A stick as set forth in claim 1 wherein said grooves are disposed in equi-spaced relation along said axis.

7. A stick as set forth in claim 1 wherein said grooves are disposed in spaced-apart groups along said axis.

8. A stick as set forth in claim 1 wherein said grooves are disposed on two opposite surfaces of said stick with the grooves in one of said surfaces being longitudinally spaced from the grooves in the other of said surfaces.

9. A stick as set forth in claim 1 which is heat-foamable into a foamed shape having at least one curvilinear portion.

10. A stick as set forth in claim 1 which is made of polystyrene with an expanding agent therein.

* * * * *

UNITED STATES PATENT AND TRADEMARK OFFICE
CERTIFICATE OF CORRECTION

PATENT NO. : 4,234,657

DATED : November 18, 1980

INVENTOR(S) : Harry Bussey, Jr.

It is certified that error appears in the above—identified patent and that said Letters Patent is hereby corrected as shown below:

Column 1, line 67, change "outer" to --other--

Signed and Sealed this

Seventeenth Day of March 1981

[SEAL]

Attest:

Attesting Officer

RENE D. TEGTMEYER

Acting Commissioner of Patents and Trademarks